US006226401B1

(12) United States Patent
Yamafuji et al.

(10) Patent No.: US 6,226,401 B1
(45) Date of Patent: *May 1, 2001

(54) IMAGE RECOGNITION SYSTEM AND APPARATUS USING ACTIVE EYES

(75) Inventors: Kazuo Yamafuji, Setagaya-ku; Junji Ooi, Yokohama, both of (JP)

(73) Assignee: Yamaha Hatsudoki Kabushiki Kaisha, Shizuoka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,918

(22) Filed: Feb. 2, 1998

(30) Foreign Application Priority Data

Jan. 31, 1997 (JP) ................................................ 9-018708

(51) Int. Cl.$^7$ ........................................................ G06K 9/00
(52) U.S. Cl. ........................ 382/165; 382/153; 382/154; 382/163; 358/520
(58) Field of Search ................................. 382/154, 153, 382/103, 224, 225; 358/520

(56) References Cited

U.S. PATENT DOCUMENTS

| | | | |
|---|---|---|---|
| 4,926,251 | * 5/1990 | Sekizawa et al. | 358/75 |
| 5,023,724 | * 6/1991 | Ferren | 358/227 |
| 5,155,775 | * 10/1992 | Brown | 382/1 |
| 5,621,824 | * 4/1997 | Ijir et al. | 382/274 |
| 5,638,461 | * 6/1997 | Fridge | 382/154 |
| 5,703,961 | * 12/1997 | Rogina et al. | 382/154 |
| 5,793,501 | * 8/1998 | Murakami | 358/520 |
| 5,917,936 | * 6/1999 | Katto | 382/154 |
| 5,920,477 | * 7/1999 | Hoffberg et al. | 364/148 |
| 6,005,959 | * 12/1999 | Mohan et al. | 382/110 |
| 6,028,955 | * 2/2000 | Cohen et al. | 382/154 |
| 6,057,909 | * 5/2000 | Yahav et al. | 356/5.04 |
| 6,058,209 | * 5/2000 | Vaidyanathan et al. | 382/203 |

OTHER PUBLICATIONS

Junji Ohwi, et al., "Development of Intelligent Mobil Robot for Service Use", The 14th Annual Conference of RSJ, Nov. 1-2-3, 1996, pp. 295-296, Nov. 1, 1996.

* cited by examiner

Primary Examiner—Jerome Grant, II
Assistant Examiner—Kevin Cyrus Kianni
(74) Attorney, Agent, or Firm—Knobbe, Marten Olson & Bear, LLP

(57) ABSTRACT

An image recognition system for recognizing a target having a color and a pattern includes a plurality of active eyes for recognizing a target. Each active eye is an information processing unit formed in a closed frame defined on a display screen, and each active eye is movable on the display screen, wherein each active eye moves until a color within the closed frame of the active eye is the color of the target in a memory, wherein plural active eyes are located at a boundary between the target and the background on the display screen, thereby forming a colony having a shape. When the shape of the colony matches the pattern of the target in the memory, the target is identified. The time of each processing cycle is very short, and thus, the movement of the object can be traced without a time lag.

8 Claims, 4 Drawing Sheets

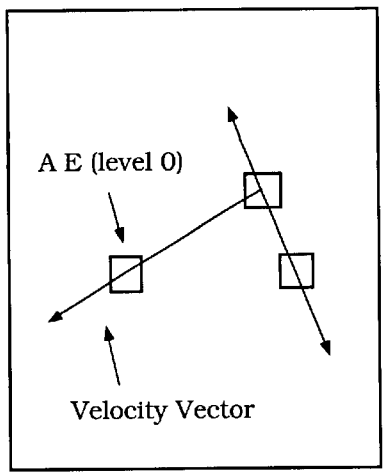
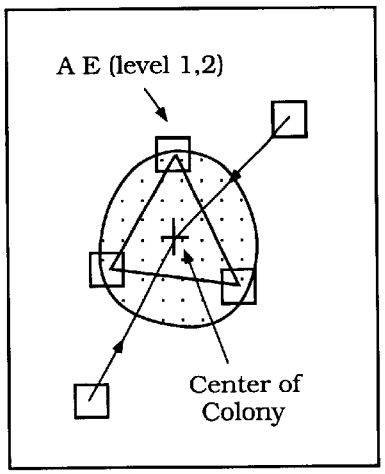
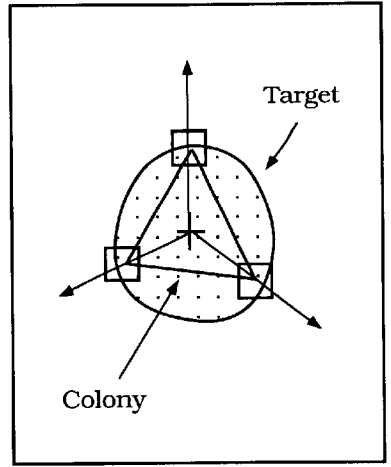
*Figure 3a*  *Figure 3b*  *Figure 3c*
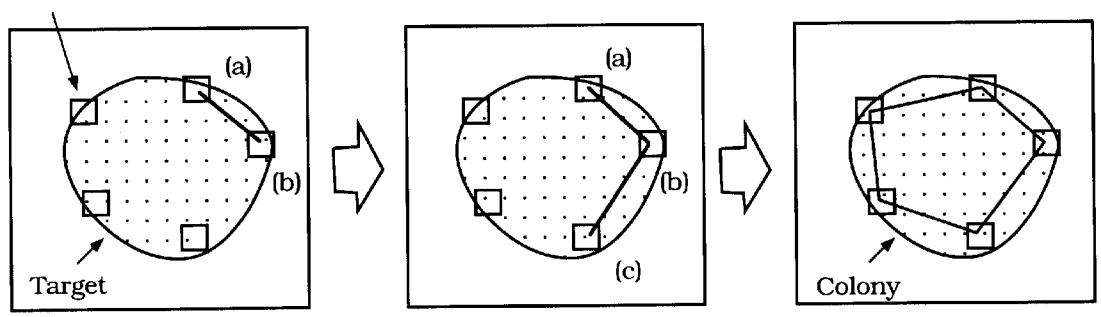
*Figure 4*
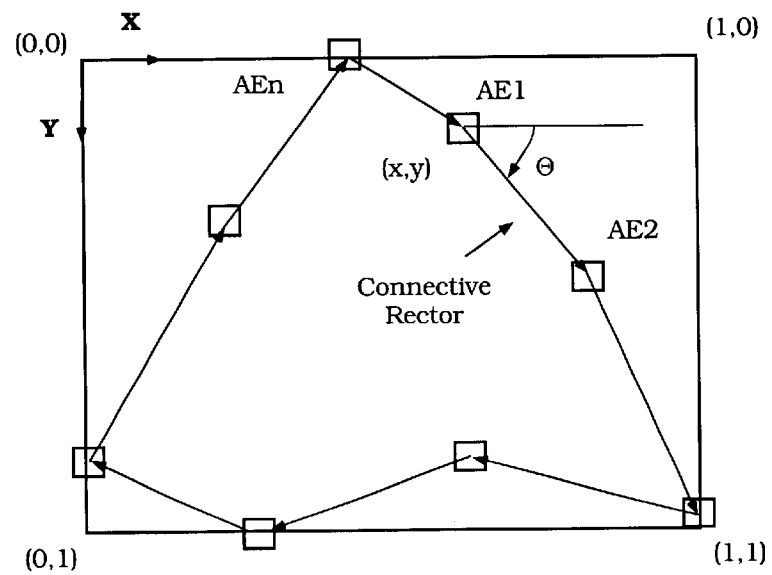
*Figure 5*

IMAGE RECOGNITION SYSTEM AND APPARATUS USING ACTIVE EYES

BACKGROUND

1. Field of the Invention

This invention relates to a system and apparatus of image recognition, and particularly to that having a simplified structure using active eyes for quick, easy, and accurate image processing.

2. Background of the Art

Picture information is a function of time and space and is characterized by open-ended characteristics (i.e., changing with time), multidimensional data, large scale data, discontinuity such as edges, and noise and uncertainty created during sampling and quantifying processes. Accordingly, an image processing system needs adaptive control processing which follows time change, real time processing which processes a large quantity of data in a real time, non-linear processing which deals with discontinuity, and robust characteristics for noise and fluctuation.

A neural network comprised of arithmetic elements called "neurons" has: mathematical characteristics and information processing capacity, which realize simultaneous parallel processing by using a number of neurons; learning capacity in which weight coupling ratio between neurons change plastically, and optimization capacity for minimizing evaluation equations under complex restraint conditions. By using the above capacities, it is possible to solve problems of large-scale optimization in image recognition, at a high speed. Also, by using the learning capacity, a system, which enables recognition of various images by changing the weight coupling ratio in an adaptive manner, has been suggested.

FIG. 9 shows one example of a conventional image recognition system. In the figure, A is image data to be processed, B is an HSI transformation unit, C is a filter, D is a binarization unit, and E is an outline extracting unit.

As described above, heretofore, image recognition systems use a particular hardware which satisfies requirements for image information processing, resulting in large-scale and costly machinery. On the other hand, without such particular hardware, it takes an extremely long time to recognize images. That is, in the conventional image recognition systems, elimination of normal noises is necessary, and processing of, for example, color transformation must be performed pixel by pixel (picture element by picture element), leading to long processing time for image recognition. Thus, heretofore, in order to shorten time for image recognition, there was no way other than reduction of the number of pixels. However, when reducing the number of pixels, accuracy suffers or is sacrificed.

In addition, the conventional image recognition systems as shown in FIG. 9 cannot provide a result until the last processing step is complete, since each processing is performed in sequence in one direction. Thus, if a processing step ceases for some reason, the interrupted step influences the whole system until the end of the process. Accurate image recognition cannot, therefore, be guarantied.

SUMMARY OF THE INVENTION

The present invention has exploited an image recognition system. An objective of the present invention is to provide an image recognition system which enables rapid, easy, and accurate image processing without using special hardware, i.e., based on a technological concept of image recognition which is distinct from the conventionally founded concept.

Namely, one important aspect of the present invention is an image recognition system for recognizing a target having a color and a pattern, comprising: a display screen for displaying a scene including a target and its background, using a CCD camera; a plurality of active eyes for recognizing the target, each active eye being an information processing unit formed in a closed frame defined on the display screen, said active eye being movable on the display screen; a memory for storing information, wherein the color and pattern of the target is stored in the memory; a controlling unit for controlling movement of the active eyes, wherein the controlling unit moves each active eye until a color within the closed frame of the active eye is the color of the target in the memory, wherein plural active eyes are located at a boundary between the target and the background on the display screen, thereby forming a colony having a shape, wherein the controlling unit further moves each active eye until the shape of the colony matches the pattern of the target in the memory; and a processing unit for receiving data from the active eyes to identify the target, wherein the processing unit calculates the location of the target based on the data from the active eyes.

In the above, preferably, the image recognition system further comprises a color processing unit, which transforms a RGB system of a color from the CCD camera into a combination of hue, saturation, and brightness, and which compares the combination of hue, saturation, and brightness with the color data of the target in the memory, thereby outputting a value indicating the likelihood of color image in each active eye matching the target.

The present invention can equally be adapted to a method.

According to the present invention, by storing information on color and pattern (shape) of an object, the location of the object can be identified regardless of the size of the object on a display screen. Thus, it is not necessary to be concerned with the location or angle of a camera, as required in a pattern matching method. The time of each processing cycle is as short as 0.03 seconds, and thus, the movement of the object can be traced without a time lag (real time tracing). Accordingly, the present invention can be adapted to a mobile robot as its eye, and further, the present invention can be applied to an intelligent mobile robot for service as a means enabling autonomous movement. It can also be adapted for detecting the location of a door knob when a robot opens or closes the door, detecting the location of a button of an elevator, detecting the location of an object such as documents when a robot hands them over, or the like.

BRIEF DESCRIPTION OF THE FIGURES

FIG. 3 is a schematic diagram showing velocity vectors of active eyes in an embodiment of the image recognition system of the present invention, in which FIGS. 3a, 3b, and 3c indicate active eye repulsion, colony attraction, and colony repulsion, respectively.

FIG. 4 is a schematic diagram showing formation of a colony in an embodiment of the image recognition system of the present invention.

FIG. 5 is a graph indicating colony coordinates in an embodiment of the image recognition system of the present invention.

DETAILED DESCRIPTION OF THE PREFERRED EMBODIMENTS

Figure 1:
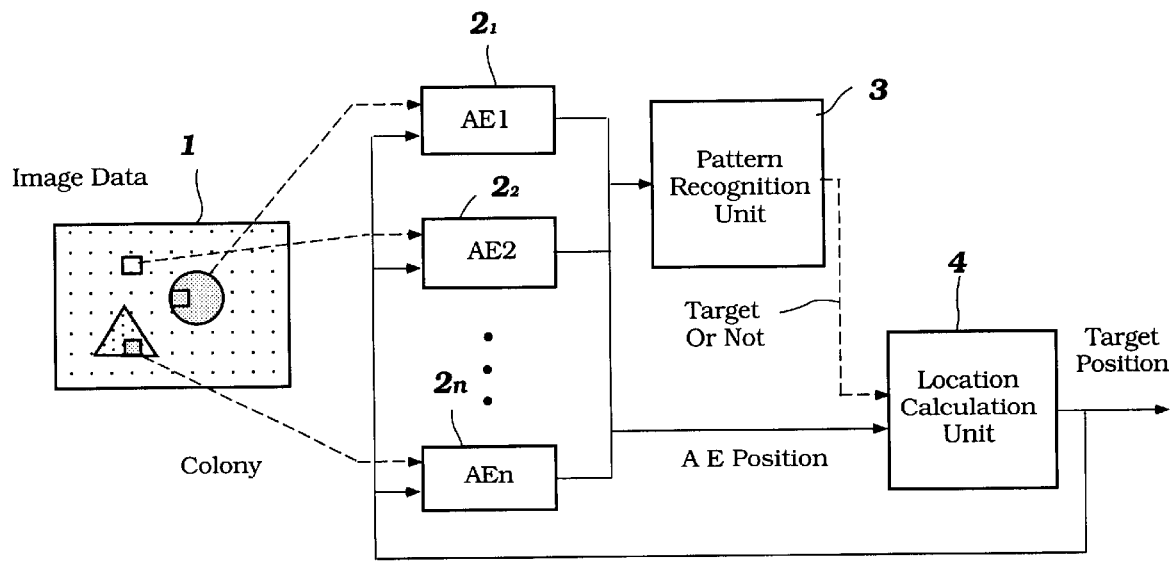
FIG. 1 is a schematic block diagram showing an embodiment of the image recognition system of the present invention.

The image recognition system of the present invention is characterized in that a plurality of active eyes indicated on a display screen determine, based on input data of an image including an object displayed on the display screen, whether the object is a preselected target recognize the shape of the object the active eyes are looking at, based on the coordinate information of a colony formed by the active eyes; and identify the location of the object. Each active eye is capable of determining whether the color the eye is looking at is the one in a memory based on at least color information obtained from the input image data, and each active eye is capable of moving on the display screen in accordance with predetermined rules.

Each active eye is typically a square frame defined on a display screen, which square frame is freely movable on the display screen (like a cursor on a computer screen), and the active eye recognizes information such as color within the square. That is, the active eye is an information processing unit on the display screen, and movement of the active eye can easily be controlled by known programming techniques. Each active eye performs autonomic movement in accordance with predetermined rules described later.

In one embodiment of the present invention, each active eye has level 0 (zero) wherein the eye loses track of the target-like object in the image data, level 1 (one) wherein the active eye was looking at the target-like object in the image data until now but loses track of it at this moment, level 2 (two) wherein the active eye is now looking at the target-like object in the image data. Further, the system as a whole has two levels: level 0 (zero) wherein all of the active eyes have level 0, and level 1 (one) wherein at least one active eye has level 1 or 2. The action (or behavior) of each active eye is regulated based on a combination of the level of the active eye and the level of the system as a whole.

The active eyes behave in accordance with the predetermined rule of action, e.g., random movement, movement toward the center of a colony, and movement away from the center of a colony. These movements of active eyes are programmed to be like behavior of flies around a food flies gather at a food source and they scatter when the food is removed.

Determination of color information in the image data by the active eyes is performed by transforming the received color information into hue, saturation, and brightness, and comparing them with the color information map stored in a memory in advance.

In shape recognition, the coordinates of a colony (i.e., a closed loop) formed by the active eyes is indicated by x-y coordinates. Position information of each active eye is composed of information on the x-y axes and information on an angle formed by the x axis and a vector connecting the active eye and an adjacent active eye. The above information is processed to output a value between 0 (zero) and 1 (one). The values from all active eyes forming the colony are averaged, and based on the averaged value outputted, shape recognition is performed.

In another embodiment of the present invention, an image recognition apparatus is provided, characterized in that the apparatus comprises: a plurality of active eyes which form colony coordinates by moving on a display screen of inputted image data in accordance with a predetermined rule of action, and which are capable of determining whether the color of an object the active eye is looking at is the one in a memory, based on at least color information of the image data; a pattern recognition means for recognizing the pattern of the object the active eyes are looking at, based on output from each active eye; and a location calculation means for identifying the location on the object the active eyes are looking at, based on output from each active eye.

EXAMPLE

The present invention will be explained with reference to FIGS. 1 to 8.

FIG. 1 shows structures of an image recognition system of one embodiment of the present invention. In the figure, the system comprises a plurality of active eyes 2, each capable of moving on a display screen of image data 1 in accordance with a predetermined rule of action and capable of determining whether the color the active eyes are looking at is the one in a memory based on at least color information of the image data; a pattern recognition (classification) unit 3 for performing pattern recognition to determine whether the object on the display screen of the image data 1 is the target; and a location calculation unit 4 for identifying the location of the object whose pattern has been recognized. The information on the location of the object is fed back to each active eye 2.

Figure 2:
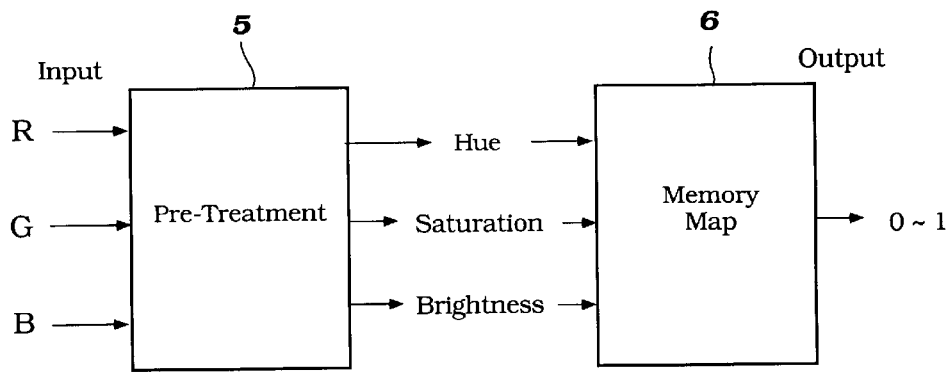
FIG. 2 is a schematic block diagram showing a method for determining color in an embodiment of the image recognition system of the present invention.

In this system, software is created to pick up and identify an object in a memory stored in advance from the image information and to determine the location of the object. That is, in this embodiment, color data obtained by the active eyes are used in picking up and identifying the object in a memory stored in advance from the image information. FIG. 2 shows a method of distinguishing the object by using color information, wherein input color information (e.g., a RGB system) is transformed into signals of hue, saturation, and brightness at a transformation unit 5 (pretreatment unit). These signals are compared with the information stored in a color information map 6 in advance, thereby outputting a value between 0 (zero) and 1 (one) wherein 0 (zero) indicates that the object is not the target, 1 (one) indicates that the object is the target. The value represents the likelihood of image (or object) matching the target.

In the above, if there are several objects having the same color in the image data, the shape or pattern of each object is also determined as described later.

Each active eye 2 is capable of determining whether the color is the one in a memory based on color information in a small region (3 pixels×3 pixels). When one or more active eyes find an object having the color stored in a memory in the image data, other active eyes move toward the location of the object in accordance with a simple rule of action described below. Accordingly, each active eye 2 gathers at the boundary between the object and the background in the image data. The coordinate information on their location is transmitted to the pattern recognition unit 3 where pattern recognition of the object the active eyes are looking at is performed as described below. In the location calculation unit 4, in order to identify the location of the object whose pattern has been recognized or classified, the coordinates of the center of the object are outputted. Since the coordinates of each active eye 2 are transmitted to both the pattern recognition unit 3 and the location calculation unit 4, as shown in FIG. 1 it is possible to determine an approximate location of the object even at a stage when the active eyes 2 have not yet clustered sufficiently to determine the pattern or shape of the object.

The rule of action of the active eyes 2 is explained below. Each active eye 2 has three levels as follows:

Level 0 (zero): the eye loses track of the target-like object in the image data.

Level 1 (one): the active eye has been looking at the target-like object in the image data until now but loses track of it at this moment.

Level 2 (two) wherein the active eye is now looking at the target-like object in the image data.

Further, the system as a whole has two levels as follows:

Level 0 (zero): all of the active eyes have level 0.

Level 1 (one): at least one active eye has level 1 or 2.

Based on a combination of these levels, the action (or behavior) of each active eye is regulated as follows:

| AME's level | AE's level | AE's action |
| --- | --- | --- |
| 0 | 0 | moving randomly |
| 1 | 0 | moving toward the center of a colony |
| 1 | 1 | moving toward the center of a colony |
| 1 | 2 | moving toward the center of a colony |

AME: Active Multi-Eye system. AE: Active Eye.

FIG. 3 shows the directions of velocity vector of active eyes 2. Squares indicate active eyes having level 0, 1, or 2. Active eyes connected with lines indicate colonies.

Formation of a colony will be explained below with reference to FIG. 4.

An active eye (a) having level 1 or 2 is linked to active eye (b) which has level 1 or 2 and which is closest to active eye (a). Active eye (b) is linked to active eye (c) which has level 1 or 2 and which is closest to active eye (b), except for active eye (a). Active eye (c) is linked to an active eye which has level 1 or 2 and which is closest to active eye (c), except for active eye (b). By repeating the above process, one colony is formed. In the above, an active eye cannot be linked to an active eye which has already been linked to another active eye. As a result, the colony is formed into a closed polygon.

FIG. 5 shows colony's coordinates. As shown in the figure, it is assumed that a colony is formed as a result of active eyes 2 gathering at a boundary between the object and the background in accordance with a rule of action.

The x-axis of the active eye on the farthest left in the colony is set at 0 (zero; x=0). The x-axis of the active eye on the farthest right in the colony is set at 1 (one; x=1). Similarly, the y-axis of the topmost active eye is set at 0 (zero; y=0). The y-axis of the bottommost active eye is set at 1 (one; y=1). An angle formed by the x-axis and a vector connecting each active eye is indicated as θ.

Figure 6:
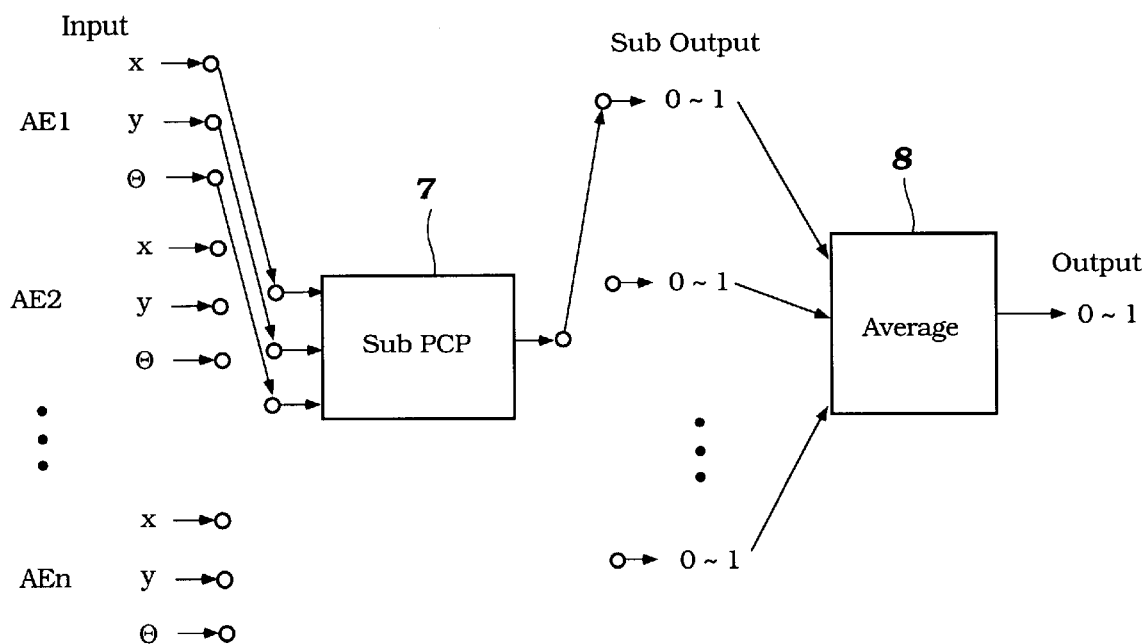
FIG. 6 is a schematic block diagram showing a pattern recognition (classification) unit in an embodiment of the image recognition system of the present invention.

The values of x, y, and θ of each active eye are inputted into a processing unit 7 in the pattern recognition unit 3 as shown in FIG. 6, thereby outputting a value between 0 (zero) and 1 (one) indicating the likelihood of image (or object) matching the target. The output signals of 0-1 indicating the likelihood of image (or object) matching the target are transferred to an averaging unit 8, thereby outputting a value between 0 (zero) and 1 (one) as an average value of the colony indicating the likelihood of image (or object) matching the target as a whole. By this average output value, pattern recognition is conducted to determine whether the object is the target.

Figure 7:
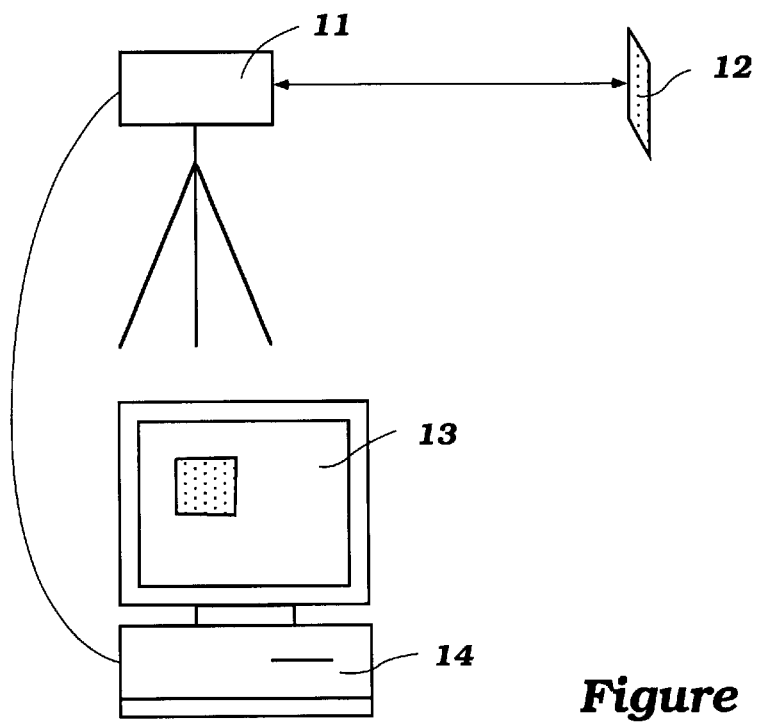
FIG. 7 is a schematic diagram showing an embodiment of the image recognition system of the present invention.

FIG. 7 shows an experimental example using an image recognition system of the present invention.

In this experiment, the time was measured after a camera 11 (CCD camera) viewed an object until the pattern of the object was identified and calculation of the position of the center of the object was completed.

Figure 8:
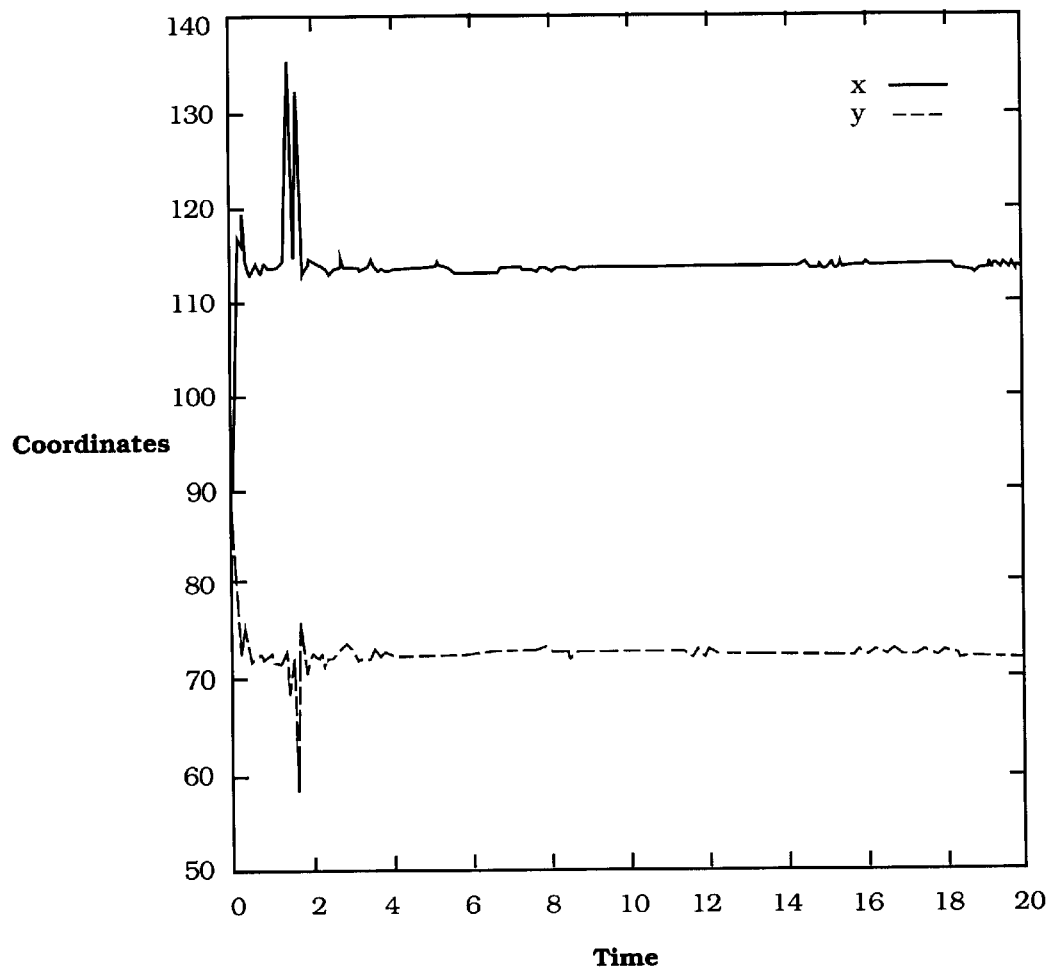
FIG. 8 is a graph indicating output of active multi-eye system in an embodiment of the image recognition system of the present invention.
Figure 9:
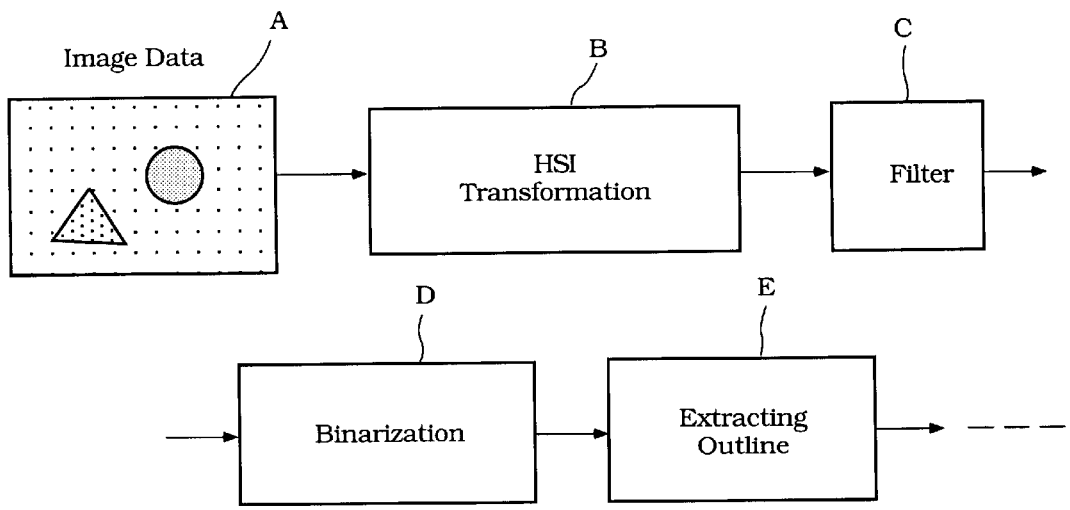
FIG. 9 is a schematic block diagram showing a conventional image processing system.

A pentium 120 MHz CPU was used as a PC 14, the number of pixels of a display screen 13 was 320×200 (pixels), and the number of active eyes on the display screen 13 was 32. As an object 12, a 75×75 mm square piece of red paper was used, and positioned 500 mm away from the camera. The relationship between coordinates of the object outputted from the system and time elapsed is shown in FIG. 8. As shown in FIG. 8, pattern recognition for identifying the object was completed in approximately 2 seconds, and values outputted thereafter were practically constant. As an image recognition system using a general purpose PC, the speed was sufficiently high, as well as accurate as compared with the high-speed system having a reduced number of pixels.

As explained above, according to the present invention, by storing information on color and pattern (shape) of an object, the location of the object can be identified regardless of the size of the object on a display screen (i.e., even if the distance between the object and the camera or the angle of the camera changes). Thus, it is not necessary to be concerned with the location or angle of a camera, as required in a pattern matching method. The time of each processing cycle (one cycle including recognition of color by the active eyes at instant coordinates, recognition of a pattern formed by the active eyes, and calculation of the location of the pattern prior to the active eyes moving to next coordinates) is as short as 0.03 seconds, and thus, the movement of the object can be traced without a time lag (real time tracing). Accordingly, the present invention can be adapted to a mobile robot as its eye, and further, the present invention can be applied to an intelligent mobile robot for service as a means enabling autonomous movement. It can also be adapted for detecting the location of a door knob when a robot opens or closes the door, detecting the location of a button of an elevator, detecting the location of an object such as documents when a robot hands them over, or the like.

Actual applications of the present invention include an apparatus, which notifies a driver that a vehicle such as a motorbike is going off a predeterminantly defined path acceptable to the driver in order to restrict its driving path in the predetermined range, an apparatus, which controls the course or route of a helicopter to a predetermined range in such a way that the helicopter sprays, for example, an agricultural chemical over fields of rice and other crops defined by their shapes, patterns, and sizes, and an apparatus, which controls working behavior or action of an industrial robot, such as controlling handling of LSI chips or the like and recognizing a predetermined installing position of parts in an assembly line.

It will be understood by those of skill in the art that numerous various modifications can be made without departing from the spirit of the present invention. Therefore, it should be clearly understood that the forms of the present invention are illustrative only and are not intended to limit the scope of the present invention.

We claim:

1. An image recognition system for recognizing a target having a color and a pattern, comprising:
(a) a display screen formed with a plurality of pixels for displaying an image including a target and its background, using a CCD camera;
(b) an active eye system comprising:
  (i) a plurality of cursor-like movable sections, denoted as active eyes, indicated on the display screen using a portion of the pixels, each active eye being a closed frame defined on the display screen and being programmed to obtain color data from the area enclosed within the frame, said active eyes being movable on the display screen under predetermined rules to move each active eye to a boundary of a region, denoted as a colony, where a color within the closed frame of the active eye matches the color of the target pre-stored in a memory;
  (ii) a pattern recognition unit for recognizing a shape of the colony which is formed when connecting plural active eyes located along the boundary of the colony, wherein if the recognized shape does not match the pattern of the target pre-stored in a memory, each active eye moves until the pattern of the target in the memory is recognized; and
  (iii) a location calculation unit programmed to calculate the coordinates of the recognized pattern of the target based on coordinates of the active eyes; and
(c) a pretreatment unit, which transfers a RGB system of a color from the CCD camera into a combination of hue, saturation, and brightness, and which compares the combination of hue, saturation, and brightness with the color data of the target in the memory, thereby outputting a value indicating the likelihood of color image in each active eye matching the target.

2. The image recognition system according to claim 1, wherein each active eye is a square of approximately 3 pixels×3 pixels.

3. The image recognition system according to claim 1, wherein the predetermined rules are as follows:
  (i) if no active eyes recognize the color of the target or form a colony of the color, the active eyes move randomly;
  (ii) if a plurality of active eyes recognize the color of the target and form a colony of the color, the active eyes move away from the center of the colony;
  (iii) if an active eye has been recognizing the color of the target until now but loses track of the color at this moment, the active eye moves toward the center of a colony located closest to the active eye,
  whereby the active eye moves ultimately to a boundary of the colony.

4. The image recognition system according to claim 1, wherein the colony is recognized by connecting the active eyes which are recognizing the color of the target or had been recognizing the color of the target but lost track of the color, under the following rules:
  (i) an active eye is linked to another active eye closest to the active eye;
  (ii) an active eye is not linked to an active eye which has already linked to another active eye.

5. A method for recognizing a target having a color and a pattern, using an image recognition system comprising:
(a) a display screen formed with a plurality of pixels for displaying an image including a target and its background, using a CCD camera;
(b) an active eye system comprising:
  (i) a plurality of cursor-like movable sections, denoted as active eyes, indicated on the display screen using a portion of the pixels, each active eye being a closed frame defined on the display screen and being programmed to obtain color data from the area enclosed within the frame;
  (ii) a pattern recognition unit for recognizing a shape which is formed when connecting plural active eyes; and
  (iii) a location calculation unit programmed to calculate the coordinates of the recognized shape based on coordinates of the active eyes; and
(c) a pretreatment unit, which transfers a RGB system of a color from the CCD camera into a combination of hue, saturation, and brightness, and which compares the combination of hue, saturation, and brightness with the color data of the target in the memory, thereby outputting a value indicating the likelihood of color image in each active eye matching the target,
said method comprising the steps of:
  (A) displaying an image including a target and its background on the display screen, using the CCD camera;
  (B) moving the active eyes on the display screen under the predetermined rules to move each active eye to a boundary of a region, denoted as a colony, where a color within the closed frame of the active eye matches the color of the target stored in a memory based on a value indicating the likelihood of color image in each active eye matching the target outputted from the pretreatment unit;
  (C) upon formation of the colony by the active eyes, comparing at the pattern recognition the shape of the colony with the pattern of the target stored in a memory, and if the shape does not match the pattern of the target, further moving the active eyes until the pattern of the target is recognized; and
  (D) calculating the coordinates of the recognized shape as the target based on coordinates of the active eyes.

6. The method according to claim 5, wherein each active eye is a square of approximately 3 pixels×3 pixels.

7. The method according to claim 5, wherein the predetermined rules are as follows:
  (i) if no active eyes recognize the color of the target or form a colony of the color, the active eyes move randomly;
  (ii) if a plurality of active eyes recognize the color of the target and form a colony of the color, the active eyes move away from the center of the colony;
  (iii) if an active eye has been recognizing the color of the target until now but loses track of the color at this moment, the active eye moves toward the center of a colony located closest to the active eye,
  whereby the active eye moves ultimately to a boundary of the colony.

8. The method according to claim 5, wherein the colony is recognized by connecting the active eyes which are recognizing the color of the target or had been recognizing the color of the target but lost track of the color, under the following rules:
  (i) an active eye is linked to another active eye closest to the active eye;
  (ii) an active eye is not linked to an active eye which has already linked to another active eye.

* * * * *